United States Patent [19]

Wheeler

[11] Patent Number: 4,525,768

[45] Date of Patent: Jun. 25, 1985

[54] CERAMIC CAPACITORS AND DIELECTRIC COMPOSITIONS

[75] Inventor: Jennifer M. Wheeler, Loughton, England

[73] Assignee: Standard Telephones and Cables, PLC, London, England

[21] Appl. No.: 584,337

[22] Filed: Feb. 28, 1984

[51] Int. Cl.$^3$ ............... H01G 4/12; C04B 35/46; H01G 7/00

[52] U.S. Cl. ............... 361/321; 29/25.42; 252/521; 501/136

[58] Field of Search ............... 361/321; 29/25.42; 501/136, 138; 252/520, 521; 423/598

[56] References Cited

U.S. PATENT DOCUMENTS

| | | | |
|---|---|---|---|
| 4,086,649 | 4/1978 | Hanold | 361/321 |
| 4,218,723 | 8/1980 | Payne et al. | 361/321 |
| 4,339,544 | 7/1982 | Sakabe et al. | 501/136 |
| 4,474,894 | 10/1984 | Härdtl | 501/136 |

Primary Examiner—Donald A. Griffin
Attorney, Agent, or Firm—Dennis P. Clarke

[57] ABSTRACT

A dielectric composition, particular suitable for the manufacture of ceramic capacitors, comprising non-stoichiometric lead magnesium niobate, non-stoichiometric lead iron niobate and one or more oxide additives, which may be chosen from the group comprising silica, managanese dioxide, ceric oxide, lanthanum oxide, zinc oxide, alumina, tungsten oxide, nickel oxide, cobalt oxide and cuprous oxide. The compositions can be fired at temperatures between 980° and 1075° C., so that in the case of multilayer ceramic capacitors high silver content internal electrodes can be used and, in cases where three or more of the oxide additives are employed, higher dielectric constants, for example 10600 to 16800, of the fired ceramics than conventional ceramics can be achieved, thus permitting capacitor device size reduction. Additions of lead titanate may also be made to the dielectric compositions.

24 Claims, No Drawings

CERAMIC CAPACITORS AND DIELECTRIC COMPOSITIONS

BACKGROUND OF THE INVENTION

This invention relates to ceramic capacitors and in particular, but not exclusively, to multilayer ceramic capacitors and dielectric compositions for use therein.

A multilayer ceramic capacitor basically comprises a stack consisting of a plurality of dielectric members formed of a ceramic material, with electrodes positioned between the members. The electrodes may be screen-printed onto the ceramic material, in the unfired state thereof, using conductive inks. A stack of screen-printed dielectric members is assembled, pressed together, cut into individual components, if appropriate, and fired until sintering occurs, in order to ensure non-porosity. The internal electrodes may be of rectangular form and cover the whole or part of the area of the adjacent dielectric layers. The internal electrodes in successive layers may be sideways stepped relative to one another or have elongate portions which cross one another, as described in our British Patent Application No. 7841677 (Ser. No. 2032689A) (A. L. Oliver—G. Mills 1-1).

With conventionally employed dielectrics the capacitors must be fired at temperatures of the order of 1200°-1400° C., which means that the internal electrodes must be of a suitable material to withstand such temperatures and that expensive noble metals, such as platinum and palladium must be used. However, if the firing temperature can be reduced, by a suitable choice of dielectric, then internal electrodes with a high silver content (50-100% silver) could be used, thus reducing costs for materials and manufacture. In our British Patent Application No. 8120605 (Ser. No. 2107300A) (J. M. Wheeler 1) there is disclosed a dielectric composition which can be fired at a temperature between 950° C. and 1100° C. and can thus be used with high silver content internal electrodes. These low firing temperature dielectrics comprise lead magnesium niobate ($PbMg_{\frac{1}{3}}Nb_{\frac{2}{3}}O_3$) with one or more of the following, namely lead titanate, lead stannate, lead zirconate, and some of these dielectric compositions have dielectric constants in the range 7500-10000, which make them particularly suitable for multilayer ceramic capacitors. The conventionally employed ceramics (U.S. coding Z5U) are not compatible with high silver content electrodes and usually have dielectric constants lower than 7500-10000. The electronics industry, generally, requires smaller components, and smaller and cheaper capacitors can be obtained by producing dielectrics which are compatible with high silver content electrodes and have even higher dielectric constants than those proposed in British Patent Application No. 8120605.

SUMMARY OF THE INVENTION

According to one aspect of the present invention there is provided a dielectric composition comprising non-stoichiometric lead magnesium niobate, non-stoichiometric lead iron niobate and one or more oxide additives.

According to another aspect of the present invention there is provided a ceramic capacitor including dielectric comprising non-stoichiometric lead magnesium niobate, non-stoichiometric lead iron niobate and one or more oxide additives.

According to a further aspect of the present invention there is provided a multilayer ceramic capacitor including a plurality of layers of a dielectric and a plurality of high silver content internal electrodes arranged between the dielectric layers, which dielectric layers are formed of non-stoichiometric lead magnesium niobate, non-stoichiometric lead iron niobate and one or more oxide additives.

According to yet another aspect of the present invention there is provided method of manufacturing a multilayer ceramic capacitor including the steps of screen printing a plurality of electrodes onto each of a plurality of dielectric members, assembling a stack of the resultant screen-printed members, pressing the stack together, dividing the pressed stack into individual capacitor components and firing the individual components at a temperature between 980° C. and 1075° C., and wherein the dielectric comprises non-stoichiometric lead magnesium niobate, non-stoichiometric lead iron niobate and one or more oxide additives.

The oxide additives may be chosen from silica, manganese dioxide, ceric oxide, lanthanum oxide, zinc oxide, alumina, tungsten oxide, nickel oxide, cobalt oxide and cuprous oxide. Preferably three or more oxide additives are chosen from the first eight of the ten mentioned above and after firing at temperatures between 980° C. and 1075° C. have dielectric constants in the range 10600 to 16800. In addition, particularly in dependence on the processing employed, additions of lead titanate ($PbTiO_3$), may be employed.

DESCRIPTION OF THE PREFERRED EMBODIMENTS

Examples of the dielectric compositions proposed by the present invention are given in the following tables. The dielectric is based on non-stoichiometric lead magnesium niobate, together with a non-stoichiometric lead iron niobate. The expression lead magnesium niobate is conventionally understood to mean $PbMg_{\frac{1}{3}}Nb_{\frac{2}{3}}O_3$. The niobate we have used is, however, non-stoichiometric and approximates to $PbMg_{\frac{1}{3}}Nb_{\frac{2}{3}}O_3$. The material actually employed and for which the results quoted in the following Tables were obtained is non-stoichiometric $PbMg_{0.443}Nb_{0.5001}O_3$. Preferably the magnesium is in the range 0.35 to 0.5. Hence the expression $PbMg_{0.35\ to\ 0.5}Nb_{0.4\ to\ 0.6}O_3$.

The base material may comprise approximately 80% (by weight) of the lead magnesium niobate and 20% (by weight) of the lead iron niobate. The lead iron niobate may comprise 71% (by weight) lead oxide (PbO), 9% (by weight) iron oxide ($Fe_2O_3$) and 20% (by weight) niobium pentoxide ($Nb_2O_5$). If the base material is fired at 1000° C. there is obtained a dielectric constant of the order of 10700, a dielectric loss (tan δ) of 9.5% and a temperature dependence of +13% for the dielectric constant at −30° C. relative to that at +25° C., and −61% for that at +85° C. relative to that at +25° C. Whilst these values for firing temperature, dielectric constant and temperature dependence are themselves suitable for multilayer ceramic capacitors, the high dielectric loss makes the base material unacceptable for such use.

We have found that the addition of one or more oxides to the base material produces improvement in the dielectric loss (tan δ) values such that the dielectrics are then acceptable for use in multilayer ceramic capacitors. The oxides may include rare earth oxides or transition metal oxides. In the Tables results are quoted for the following oxides, namely: silica ($SiO_2$); manganese dioxide ($MnO_2$); ceric oxide ($CeO_2$); lanthanium oxide ($La_2O_3$); zinc oxide (ZnO); alumina ($Al_2O_3$); tungsten oxide ($WO_3$); nickel oxide (NiO); cobalt oxide (CoO) and cuprous oxide ($Cu_2O$).

Tables 1 to 6 show the results obtained for varying numbers and size of the oxide additives. Table 1 relates to dielectric compositions comprising 99.9% (by weight) of the base material mentioned above and 0.1% (by weight) of one oxide additive. Table 2 relates to dielectric compositions comprising 99.8% (by weight) of the base material and 0.2% (by weight) of one oxide additive. Table 3 relates to dielectric compositions comprising 99.8% (by weight) of the base material and 0.1% (by weight) of each of two oxide additives. Table 4 relates to dielectric compositions comprising 99.7% (by weight) of the base material and 0.1% (by weight) of each of three oxide additives. Table 5 relates to dielectric compositions comprising 99.6% (by weight) of the base material and 0.1% (by weight) of each of four oxide additives. Table 6 relates to a dielectric composition with 99.5% (by weight) of the base material and 0.1% (by weight) of each of five oxide additives. All of the compositions were fired for one hour and aluminium electrodes evaporated onto a surface so that the electrical properties, could be measured, that is dielectric constant, dielectric loss (tan δ) and the temperature dependence (in %) of the dielectric constant at −30° C. and +85° C. with respect to the dielectric constant at +25° C.

| Addition | Firing Temperature °C. | Dielectric Constant | Tan δ (%) | Temperature −30-25° C. (%) | Dependence 25-85° C. (%) |
|---|---|---|---|---|---|
| ZnO | 990 | 11900 | 1.7 | +12.0 | −59.1 |
|  | 1000 | 10600 | 3.1 |  |  |
|  | 1025 | 9200 | 3.1 |  |  |
| $SiO_2$ | 990 | 10650 | 2.3 | +14.3 | −58.8 |
|  | 1000 | 9600 | 2.6 |  |  |
|  | 1025 | 8100 | 3.9 |  |  |
| $Al_2O_3$ | 990 | 10800 | 2.1 | +13.5 | −59.5 |
|  | 1000 | 9700 | 2.3 |  |  |
|  | 1025 | 8600 | 2.3 |  |  |
| NiO | 990 | 10500 | 2.2 | +13.9 | −57.6 |
|  | 1000 | 10550 | 2.5 |  |  |
|  | 1025 | 7500 | 2.5 |  |  |
| $MnO_2$ | 990 | 10800 | 1.9 | +18.2 | −55.8 |
|  | 1000 | 9200 | 1.7 |  |  |
|  | 1025 | 7850 | 3.6 |  |  |
| $CeO_2$ | 990 | 8650 | 2.8 | +18.5 | −55.7 |
|  | 1000 | 9450 | 1.4 |  |  |
|  | 1025 | 11050 | 2.3 |  |  |
| CoO | 980 | 8150 | 1.2 | +6.4 | −57.8 |
|  | 1000 | 9100 | 1.5 |  |  |
| $Cu_2O$ | 980 | 6550 | 1.4 | +10.1 | −54 |
|  | 1000 | 9350 | 1.3 |  |  |
| $WO_3$ | 980 | 9500 | 1.6 | +13.7 | −59 |
|  | 1000 | 11600 | 1.5 |  |  |
| $La_2O_3$ | 980 | 8100 | 0.75 | +12.4 | −59.0 |
|  | 1000 | 8800 | 1.0 |  |  |
|  | 1025 | 4100 | 0.65 |  |  |

TABLE 2

| Addition | Firing Temperature (°C.) | Dielectric Constant | Tan δ (%) | Temperature −30-25° C. (%) | Dependence 25-85° C. (%) |
|---|---|---|---|---|---|
| $MnO_2$ | 980 | 6500 | 2.5 | +6.7 | −52.8 |
|  | 1000 | 8100 | 3.3 |  |  |
| $CeO_2$ | 980 | 8300 | 1.8 | +12.9 | −57.2 |
|  | 1000 | 9500 | 1.6 |  |  |
| $WO_3$ | 980 | 8300 | 3.3 | +12.7 | −57.2 |
|  | 1000 | 10400 | 3.1 |  |  |
| NiO | 980 | 8700 | 2.7 | +10.6 | −58.3 |
|  | 1000 | 10400 | 2.9 |  |  |
| $Al_2O_3$ | 980 | 9100 | 2.5 | +7.7 | −55.6 |
|  | 1000 | 10700 | 2.2 |  |  |
| $SiO_2$ | 980 | 9500 | 3.9 | +7.3 | −55.6 |
|  | 1000 | 10800 | 3.6 |  |  |
| ZnO | 980 | 8500 | 2.7 | +6.9 | −56.3 |
|  | 1000 | 10500 |  |  |  |

TABLE 3

| Addition | Firing Temperature (°C.) | Dielectric Constant | Tan δ (%) | Temperature −30-25° C. (%) | Dependence 25-85° C. (%) |
|---|---|---|---|---|---|
| $SiO_2MnO_2$ | 980 | 7700 | 0.65 | +10.9 | −55.9 |
|  | 1000 | 7700 | 1.1 | +13.6 | −63.1 |
|  | 1025 | 12950 | 0.55 |  |  |
|  | 1050 | 4600 | 0.5 |  |  |
| $SiO_2CeO_2$ | 980 | 7200 | 0.65 | +12.3 | −56.6 |
|  | 1000 | 9250 | 0.67 | +33.8 | −63.2 |
|  | 1025 | 14000 | 0.65 |  |  |
| $SiO_2WO_3$ | 980 | 6800 | 0.75 | +12.6 | −59.6 |
|  | 1000 | 10050 | 2.00 | +14.9 | −60.4 |
|  | 1025 | 14700 | 0.83 |  |  |
| $SiO_2NiO_2$ | 980 | 6900 | 0.75 | +13.1 | −60.2 |
|  | 1000 | 11000 | 1.8 | +13.8 | −58.8 |
|  | 1025 | 15300 | 0.9 |  |  |
| $SiO_2Al_2O_3$ | 980 | 8700 | 0.85 | +12.5 | −58.5 |
|  | 1000 | 9800 | 1.7 | +9.0 | −57.1 |
|  | 1025 | 14100 | 0.93 |  |  |
| $SiO_2ZnO$ | 980 | 9900 | 1.38 | +11.5 | −56.7 |
|  | 1000 | 9700 | 1.75 |  |  |

TABLE 4

| Additions 0.1 wt % | Firing Temperature °C. | Dielectric Constant | Tan δ | Temperature −30° C. (%) | Dependence +85° C. (%) |
|---|---|---|---|---|---|
| $SiO_2MnO_2Al_2O$ | 1000 | 11400 | 0.75 | +14 | −63 |
|  | 1010 | 11200 | 0.93 | +21 | −63 |
|  | 1050 | 12500 | 0.40 |  |  |
| $SiO_2MnO_2NiO$ | 1000 | 11200 | 0.83 | +17 | −65 |
|  | 1010 | 12400 | 0.50 | +19 | −66 |
|  | 1050 | 11950 | 0.44 |  |  |
| $SiO_2MnO_2WO_3$ | 1000 | 12100 | 0.68 | +18 | −66 |
|  | 1010 | 13800 | 0.50 | +16 | −71 |
|  | 1050 | 12500 | 0.47 |  |  |
| $SiO_2MnO_2La_2O_3$ | 1000 | 12900 | 0.56 | +30 | −69 |
|  | 1025 | 13500 | 0.53 |  |  |
| $SiO_2CeO_2La_2O_3$ | 1000 | 12000 | 0.42 | +25 | −68 |
|  | 1025 | 12300 | 0.38 | +35 | −68 |
| $SiO_2CeO_2ZnO$ | 1000 | 14550 | 0.69 | +15 | −60 |
|  | 1025 | 14500 | 0.74 | +22 | −67 |
| $SiO_2CeO_2Al_2O_3$ | 1025 | 13100 | 0.42 | +23 | −65 |
| $SiO_2CeO_2WO_3$ | 1000 | 10600 | 1.27 | +18 | −62 |
|  | 1025 | 13500 | 0.49 | +24 | −64 |
| $SiO_2CeO_2NiO$ | 1000 | 14500 | 0.56 | +22 | −91 |
|  | 1025 | 13900 | 0.41 |  |  |
| $SiO_2La_2O_3ZnO$ | 1000 | 12400 | 0.82 | +21 | −66 |
|  | 1025 | 14500 | 0.61 | +28 | −81 |
| $SiO_2La_2O_3Al_2O_3$ | 1000 | 11550 | 0.62 | +22 | −64 |
|  | 1025 | 13250 | 0.56 | +27 | −65 |
| $SiO_2La_2O_3WO_3$ | 1000 | 14400 | 0.79 | +19 | −57 |
|  | 1025 | 14200 | 0.55 | +36 | −69 |
|  | 1075 | 13050 | 0.67 |  |  |
| $SiO_2La_2O_3NiO$ | 1000 | 14900 | 0.83 | +17 | −72 |
|  | 1025 | 14800 | 0.74 | +32 | −67 |
| $SiO_2ZnO\ Al_2O_3$ | 1000 | 13600 | 1.38 | −78, +6 | −56 |
|  | 1025 | 16150 | 1.08 | +21 | −69 |
|  | 1075 | 14350 | 1.10 | +18 | −67 |
| $SiO_2ZnO\ WO_3$ | 1000 | 15700 | 1.56 | +10 | −57 |
|  | 1025 | 14900 | 0.94 | +20 | −68 |
|  | 1075 | 14000 | 1.04 |  |  |
| $SiO_2ZnO\ NiO$ | 1000 | 13500 | 1.22 | −81, +8 | −64 |
|  | 1025 | 15700 | 1.08 | +20 | −67 |
|  | 1075 | 14500 | 1.08 | +18 | −67 |
| $SiO_2Al_2O_3WO_3$ | 1000 | 12700 | 1.02 | +40 | −57 |
|  | 1025 | 15900 | 0.62 | +27 | −68 |
|  | 1075 | 14800 | 0.88 | +20 | −68 |
| $SiO_2Al_2O_3NiO$ | 1000 | 12250 | 0.97 | +10 | −50 |
|  | 1025 | 16000 | 0.88 | +24 | −68 |
|  | 1075 | 15200 | 1.04 | +18 | −66 |
| $SiO_2WO_3NiO$ | 1000 | 15400 | 1.06 | +13 | −60 |
|  | 1025 | 15700 | 0.69 | +18 | −66 |
|  | 1075 | 14200 | 0.74 |  |  |

TABLE 5

| Addition | Firing Temperature (°C.) | Dielectric Constant | Tanδ (%) | Temperature −30–25° C. (%) | Dependence 25–85° C. (%) |
|---|---|---|---|---|---|
| $SiO_2WO_3$ | 1025 | 13800 | 0.9 | +21.9 | −63.5 |
| $NiOAl_2O_3$ | 1050 | 15950 | 1.0 | +25.6 | −68.8 |
| $SiO_2WO_3$ | 1025 | 13600 | 1.0 | +19.7 | −63.6 |
| $NiO\ ZnO$ | 1050 | 16200 | 0.96 | +22.2 | −68.8 |
| $SiO_2NiO$ | 1025 | 15100 | 1.17 | +15.6 | −62.1 |
| $ZnO\ Al_2O_3$ | 1050 | 16800 | 0.99 | +20.7 | −67.0 |

TABLE 6

| Addition | Firing Temperature (°C.) | Dielectric Constant | Tanδ (%) | Temperature −30–25° C. (%) | Dependence 25–85° C. (%) |
|---|---|---|---|---|---|
| $SiO_2WO_3$ | 1025 | 14900 | 0.92 | +20.5 | −72.8 |
| $NiO\ Al_2O_3$ $ZnO$ | 1050 | 15800 | 0.71 | +25.3 | −68.9 |

TABLE 7

| Addition of PbTiO3 (in %) | Firing Temperature °C. | Dielectric Constant | Tan (%) | Temperature −30-25° C. (%) | Dependence 25-85° C. (%) |
| --- | --- | --- | --- | --- | --- |
| 2.15 | 1000 | 6470 | 1.12 | +5.5 | −46.0 |
|  | 1050 | 11070 | 1.1 | +9.1 | −53.6 |
|  | 1075 | 12920 | 1.09 | +9.5 | −54.8 |
|  | 1100 | 13605 | 1.11 | +30.2 | −63.0 |
| 3.01 | 1000 | 5570 | 2.12 | +4.5 | −42.7 |
|  | 1050 | 9810 | 1.3 | +5.1 | −50.8 |
|  | 1075 | 13720 | 1.51 | +5.5 | −60.2 |
|  | 1100 | 11640 | 1.30 | +7.0 | −55.8 |
| 4.30 | 1000 | 5390 | 2.8 | +2.85 | −36.7 |
|  | 1050 | 12510 | 3.8 | +2.2 | −46.1 |
|  | 1075 | 14120 | 3.6 | +1.5 | −46.7 |
|  | 1100 | 13120 | 3.5 | +1.7 | −51.4 |
| 6.46 | 1000 | 5845 | 3.6 | −61.2 | +24.4 |
|  | 1050 | 11540 | 4.8 | −72.8 | +23.8 |
|  | 1075 | 14145 | 5.1 | −75.0 | +24.8 |
|  | 1100 | 13290 | 5.6 | −74.0 | +20.3 |

As will be appreciated from Tables 1 and 2, the addition of only one oxide additive serves to substantially reduce the dielectric loss from the 9.5% value of the base material, although the values obtained are generally still too high for use in multilayer ceramic capacitors, and whilst the firing temperatures are suitable for use with high silver content electrodes the dielectric constants obtained are generally of the same order as those obtained with the compositions proposed in our co-pending Application whereas higher values of dielectric constant would be preferable, if obtainable, for future multilayer ceramic capacitors. The use of 0.2% (by weight) for the addition generally results in lower dielectric constant and higher tan δ than the use of 0.1 (by weight).

The results of employing two different oxide additives together are quoted in Table 3. The firing temperatures are again compatible with high silver content electrodes and the dielectric loss (tan δ) values are still further reduced however, in general, the dielectric constant levels are still lower than those aimed for. The compositions of Tables 1 to 3, and Table 3 in particular, could, however, be of benefit in certain capacitor applications.

The results of employing three different oxide additives together are quoted in Table 4. The dielectric constants obtained are higher than these quoted in Tables 1 to 3 and are in the range 10600 to 16000 with firing temperatures in the range 1000–1075° and acceptable values of tan δ, thus making them eminently suitable for multilayer ceramic capacitors with high silver content internal electrodes.

Tables 5 and 6 show, respectively, results obtained when using four or five of the oxide additives. These too provide high dielectric constants with low tan and firing temperatues suitable for use with high silver content internal electrodes. The dielectric constants are, in general, slightly higher than those obtained with three oxide additives, although the temperature dependence was found to be out of the Z5U range between 10° C. and 85° C. (E1A Code) of +22%, −56%.

The examples quoted in the above tables employed ball milling for grinding and mixing of the constituent powders. However, it was subsequently found that if different milling techniques were employed then in some cases the parameters of the produced dielectrics were adversely affected. In particular, when a vibromill was employed, in order to reduce problems caused by porosity, then some parameter values were reduced.

The parameters may however, we have found, be brought back to the order of levels quoted previously by the addition of lead titanate ($PbTiO_3$) up to 10%, for example. Table 7 shows the effect of the addition of various levels of lead titanate on a ceramic comprising the basic powder (lead magnesium niobate and non-stoichoimetric lead iron niobate) together with silica, alumina and nickel oxide at the 0.1% level.

As will be appreciated by comparison of the Table 7 figures with those of Table 4 for silica, alumina and zinc oxide, the ceramic materials of Table 7 have a substantially lower dielectric constant after firing at 1000° C. although with 2.15% lead titanate addition the tan δ is in fact lower than without it. After firing at 1075 C. the dielectric constants of Table 7 ceramics are only slightly lower than that in Table 4, although tan δ, except for the lowest quoted lead titanate addition, is higher and increases with increasing lead titanate level. The temperature dependence of the majority of the three lower addition level results quoted is within the Z5U range.

A method of manufacturing a multilayer ceramic capacitor using the dielectric compositions described above, particularly but not exclusively with reference to Tables 4 to 6, may comprise the steps of screen printing a plurality of electrodes on each of a plurality of unfired dielectric sheets with a high silver content ink; assembling a stack of such printed sheets with the electrodes of alternate layers arranged relative to one another as appropriate to the particular construction employed, for example sideways stepped or overlapping cross-wise; pressing the sheets together with extra blank ceramic sheets applied to the top and bottom of the stack if required; cutting the sheets to form individual capacitor components and firing the individual components at a temperature between 1000° C. and 1075° C. Subsequently the electrodes between every other sheet may be connected in a conventional manner (end terminated) by the appropriate application of conductive paint, for example, to opposite end (side) faces of the stack.

Whilst specific reference has been made to the use of high silver content electrodes, the dielectric compositions of the present invention may be used with other electrode materials such as palladium, platinum or gold.

Whilst specific mention has been made of multilayer capacitors with internal electrodes, the dielectric compositions of the present invention can alternatively be used with other ceramic capacitor types, with or without electrodes that are fired with the ceramic.

I claim:

1. A dielectric composition comprising non-stoichiometric lead magnesium niobate, non-stoichiometric lead iron niobate and one or more oxide additives.

2. A composition as claimed in claim 1, wherein the lead magnesium niobate comprises $PbMg_{0.35\ to\ 0.5}Nb_{0.4\ to\ 0.6}O_3$.

3. A composition as claimed in claim 1, wherein the oxide additives are chosen from the group comprising silica, manganese dioxide, ceric oxide, lanthanum oxide, zinc oxide, alumina, tungsten oxide, nickel oxide, cobalt oxide and cuprous oxide.

4. A composition as claimed in claim 1, which can be fired at a temperature between 980° and 1075° C.

5. A composition as claimed in claim 1 including three or more of the oxide additives and having a dielectric constant after firing between 10600 and 16800.

6. A composition as claimed in claim 1, wherein the lead iron niobate comprises 71% by weight lead oxide, 9% by weight iron oxide and 20% by weight niobium pentoxide.

7. A composition as claimed in claim 1, wherein the lead magnesium niobate and the lead iron niobate together comprise a base material consisting substantially of 80% by weight of the lead magnesium niobate and 20% by weight of the lead iron niobate; and wherein the additives are added to the base material at the 0.1% by weight level.

8. A composition as claimed in claim 7, comprising 99.7% by weight of the base material and 0.1% by weight of each of three of the oxide additives.

9. A dielectric composition as claimed by claim 7 and whose additives are as indicated in one of the Examples quoted in Tables 4, 5 or 6.

10. A dielectric composition as claimed in claim 1 and additionally comprising lead titanate.

11. A dielectric composition as claimed in claim 10 and including up to 10% lead titanate.

12. A ceramic capacitor including dielectric comprising non-stoichiometric lead magnesium niobate, non-stoichiometric lead iron niobate and one or more oxide additives.

13. A ceramic capacitor as claimed in claim 12, wherein the lead magnesium niobate comprises $PbMg_{0.35 \text{ to } 0.5}Nb_{0.4 \text{ to } 0.6}O_3$.

14. A ceramic capacitor as claimed in claim 12, wherein the oxide additives are chosen from the group comprising silica, managanese dioxide, ceric oxide, lanthanum oxide, zinc oxide, alumina, tungsten oxide, nickel oxide, cobalt oxide and cuprous oxide, and wherein the dielectric is fired at a temperature between 980° and 1075° C.

15. A ceramic capacitor as claimed in claim 12, wherein the dielectric additionally comprises lead titanate.

16. A ceramic capacitor as claimed in claim 12, including higher silver content internal electrodes fired with the dielectric.

17. A multilayer ceramic capacitor including a plurality of layers of dielectric and a plurality of high silver content internal electrodes arranged between the dielectric layers, which dielectric layers are formed of non-stoichiometric lead magnesium niobate, non-stoichiometric lead iron niobate and one or more oxide additives.

18. A multilayer ceramic capacitor as claimed in claim 17, wherein the lead magnesium niobate comprises $PbMg_{0.35 \text{ to } 0.5}Nb_{0.4 \text{ to } 0.6}O_3$.

19. A multilayer ceramic capacitor as claimed in claim 17, wherein the oxide additives are chosen from the group comprising silica, managanese dioxide, ceric oxide, lanthanum oxide, zinc oxide, alumina, tungsten oxide, nickel oxide, cobalt oxide and cuprous oxide, and wherein the dielectric is fired at a temperature between 980° and 1075° C.

20. A multilayer ceramic capacitor as claimed in claim 17, wherein the dielectric additional comprises lead titanate.

21. A method of manufacturing a multilayer ceramic capacitor including the steps of screen-printing a plurality of electrodes onto each of a plurality of dielectric members, assembling a stack of the resultant screen-printed members, pressing the stack together, dividing the pressed stack into individual capacitor, and firing the components between 980° and 1075° C., and wherein the dielectric comprises non-stoichiometric lead magnesium niobate, non-stoichiometric lead iron niobate and one or more oxide additives.

22. A method as claimed in claim 21 wherein the lead magnesium niobate comprises $PbMg_{0.35 \text{ to } 0.5}Nb_{0.4 \text{ to } 0.6}O_3$.

23. A method as claimed in claim 21, wherein the oxides are chosen from the group comprising silica, managanese dioxide, ceric oxide, lanthanum oxide, zinc oxide, alumina, tungsten oxide, nickel oxide, cobalt oxide and cuprous oxide.

24. A method as claimed in claim 21, wherein the dielectric additionally comprises lead titanate.

* * * * *